(12) United States Patent
Ishida (10) Patent No.: US 8,553,107 B2
(45) Date of Patent: Oct. 8, 2013

(54) IMAGING APPARATUS AND METHOD OF ADJUSTING A NOISE SIGNAL

(75) Inventor: Toshiki Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/177,342

(22) Filed: Jul. 6, 2011

(65) Prior Publication Data
US 2011/0261235 A1 Oct. 27, 2011

Related U.S. Application Data

(63) Continuation of application No. 12/146,283, filed on Jun. 25, 2008, now Pat. No. 7,999,864.

(30) Foreign Application Priority Data

Jul. 12, 2007 (JP) .................................. 2007-183643

(51) Int. Cl.
*H04N 5/217* (2011.01)
*H04N 3/14* (2006.01)

(52) U.S. Cl.
USPC ............................ 348/241; 348/297; 348/308

(58) Field of Classification Search
USPC ................................................... 348/241, 308
See application file for complete search history.

(56) References Cited

U.S. PATENT DOCUMENTS

| 7,569,868 | B2 * | 8/2009 | Watanabe et al. | 257/184 |
|---|---|---|---|---|
| 7,741,593 | B2 * | 6/2010 | Iwata et al. | 250/214 R |
| 7,936,386 | B2 * | 5/2011 | Toya et al. | 348/241 |
| 8,067,720 | B2 * | 11/2011 | Matsuda | 250/208.1 |
| 8,134,622 | B2 * | 3/2012 | Kobayashi | 348/300 |
| 2012/0086841 | A1 * | 4/2012 | Ono et al. | 348/300 |

\* cited by examiner

*Primary Examiner* — Ngoc-Yen Vu
(74) *Attorney, Agent, or Firm* — Canon USA Inc IP Division

(57) ABSTRACT

An imaging apparatus includes a plurality of photoelectric conversion units configured to output an image signal obtained by executing photoelectric conversion and a noise signal; a clipping unit configured to clip the noise signal to a clipping level when the noise signal exceeds a preset clipping level; a control unit configured to calculate the clipping level based on a signal read from the plurality of photoelectric conversion units and set the calculated clipping level to the clipping unit as the preset clipping level; and a differential unit configured to execute differential processing of subtracting a noise signal read from the photoelectric conversion unit and clipped by the clipping unit, from an image signal read from the plurality of the photoelectric conversion units.

3 Claims, 9 Drawing Sheets

IMAGING APPARATUS AND METHOD OF ADJUSTING A NOISE SIGNAL

CROSS-REFERENCE TO RELATED APPLICATIONS

This application is a continuation of U.S. patent application Ser. No. 12/146,283 filed Jun. 25, 2008 and entitled "IMAGING APPARATUS AND ITS CONTROL METHOD FOR SETTING SUITABLE CLIPPING LEVEL," which claims priority from Japanese Patent Application No. 2007-183643 filed Jul. 12, 2007, all of which are hereby incorporated by reference herein in their entirety.

BACKGROUND OF THE INVENTION

1. Field of the Invention

The present invention relates to an imaging apparatus which processes an image signal obtained by photoelectric conversion, and its control method.

2. Description of the Related Art

In recent years, a complementary metal-oxide semiconductor (CMOS) sensor has drawn much attention since it has low electric power consumption, shows a high signal-to-noise ratio (SN ratio) equivalent to a charge-coupled device (CCD), and its signal processing circuit can be manufactured by the same semiconductor process as a photoelectric conversion unit.

Figure 9:
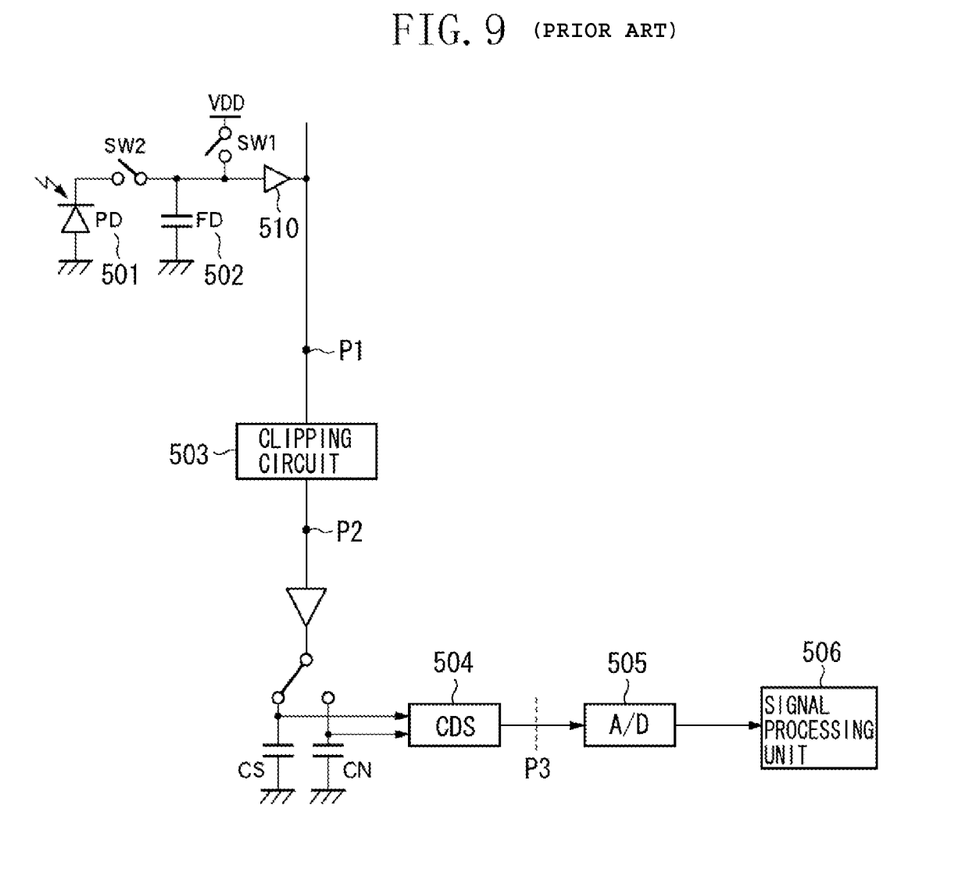
FIG. 9 is a block diagram illustrating a configuration of one pixel of a conventional CMOS sensor and a signal processing unit.

FIG. 9 is a diagram illustrating a readout path for a signal of one pixel and a configuration for processing a readout signal in the conventional CMOS sensor containing a plurality of pixels. When exposure of the CMOS sensor starts, first a switch SW1 is turned on and an electric charge accumulated in an area mainly comprised of a floating diffusion unit (FD) 502 is reset in the input portion of an amplifier 510. Then, after the SW1 is turned off, the electric charge of the FD 502 is read out into a capacitance CN (noise signal). Next, a switch SW2 is turned on to transfer the electric charge accumulated in a photodiode (PD) 501 which is obtained by photoelectric conversion, to the FD 502 and read out the charge into a capacitance CS (image signal). The image signal held in the capacitance CS and the noise signal held in the capacitance CN is differentiated by a correlated double sampling (CDS) circuit 504. Thus, an image signal from which a noise component is removed can be output. The image signal is further converted into a digital signal by an analog-to-digital (A/D) converter 505 and subjected to signal processing by a signal processing circuit 506.

In a CMOS sensor having the above-described configuration, it has been known that a phenomenon referred to as high-brightness darkening occurs. The high-brightness darkening is the phenomenon in which when a significantly large amount of light enters, an output signal abruptly disappears and an area irradiated with the light appears black as if the light does not enter.

It is considered that this high-brightness darkening is caused by electric charge which cannot be held by the PD 501 and flows into the FD 502 when a significantly large amount of light is incident on the pixel PD 501. Thus, if electric charge flows into the FD 502, a readout noise signal rapidly becomes large, so that the difference (output signal) between an image signal and a noise signal is reduced.

In Japanese Patent Application Laid-Open No. 2000-287131, in order to alleviate the high-brightness darkening, a rapid rise of the noise signal is detected by comparing the noise signal and a threshold value. Thus, the noise signal can be clipped to a fixed value.

However, although the noise signal is clipped, if an error occurs in the threshold value used for determining the darkening, or in the level of the clipped signal, the darkening may remain. This point will be described below.

FIGS. 10A to 10E illustrate the transition of an image signal obtained by the CMOS sensor in one line scanning when a high-brightness object such as the sun is shot at each point in the path of the CMOS sensor illustrated in FIG. 9.

FIG. 10 is a schematic diagram illustrating the amount of electric charge accumulated on each pixel of the CMOS sensor when the high-brightness object like the sun is shot. FIG. 10 B is a diagram illustrating one line of a noise signal N and an image signal S at the point P1 in FIG. 9. The vertical line indicates the level of signals and the horizontal axis indicates the position of pixels in a horizontal direction. In the image signal S, the amount of electric charge (incident level) obtained by photoelectric conversion in the PD 501 exceeds a saturation level. Thus, the saturation level will be continued. When the incident level reaches a supersaturation level which further exceeds the saturation level, electric charge leaks from the PD 501 to the FD 502. Thus, a value of the noise signal N becomes larger than the surrounding values. If the noise signal N is input to the CDS circuit 504 as it is and differential processing (S-N) between the noise signal N and the image signal S is carried out, the output level of the pixel exceeding the supersaturation level is significantly reduced compared with the surrounding values.

Figure 10A:
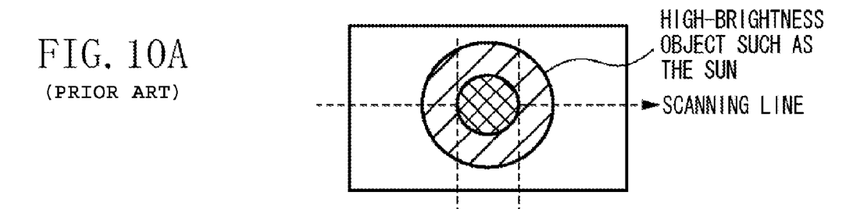
FIGS. 10A to 10E are diagrams illustrating the transition of a conventional pixel level at each processing step when darkening occurs.
Figure 10B:
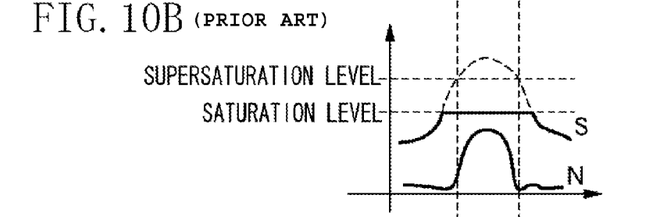
Figure 10C:
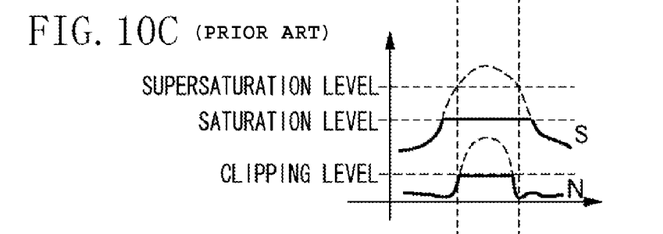
Figure 10D:
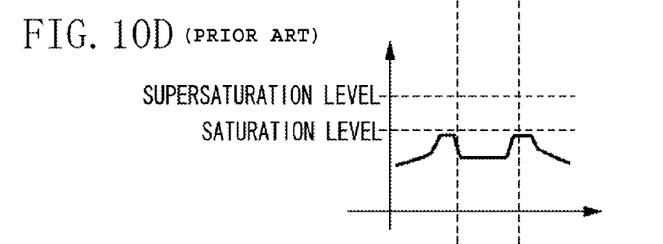

On the other hand, if a clipping circuit 503 is provided to clip the noise level to a threshold value when the noise signal N exceeds the threshold value (clipping level) (FIG. 10C), a decrease of level in a supersaturation area can be alleviated (FIG. 10D).

Figure 10E:
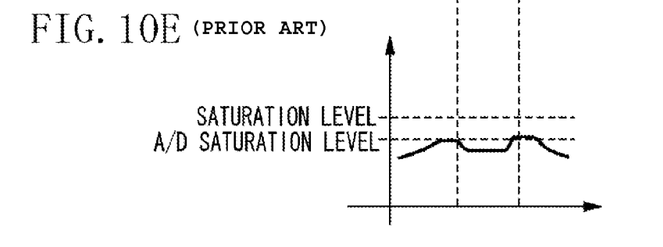

If the threshold value is set low, the darkening can be eliminated, however, it becomes highly possible that even a normal noise component can be clipped, which leads to deterioration of an image quality. Conversely, if the threshold value is set high, there is a possibility that the darkening may not be suppressed. FIGS. 10C and 10D illustrate input and output of the CDS circuit 504 when the darkening is not completely eliminated by the setting of the threshold value at points P2 and P3 respectively. In order to eliminate the unevenness of the saturation level for each pixel, also the A/D converter 505 clips the signal to an upper limit of a predetermined level (FIG. 10E). Here, if a range to be clipped is also reduced, the impact of the darkening can be eliminated. However, this causes degradation of an image quality. As a result, with respect to the output of the A/D converter 505, a pixel area which is at a lower level than the saturation level may be generated inside the pixel area of the saturation level. For example, when the sun is shot, the level of the center of the sun may be lower than the periphery of the sun.

Further, when the level of a noise signal fluctuates depending on a change in environment such as electric voltage and temperature, if only one clipping level is set and always applied to the signal, deterioration of an S/N ratio cannot be prevented.

SUMMARY OF THE INVENTION

The present invention is directed to an imaging apparatus and its control method which can set a more suitable clipping level depending on a shooting situation.

According to an aspect of the present invention, an imaging apparatus includes a plurality of photoelectric conversion units configured to output an image signal and a noise signal, a clipping unit configured to clip each noise signal to a clipping level if the noise signal exceeds a preset threshold level, a clipping level control unit configured to calculate the threshold level based on the signals read from the plurality of photoelectric conversion units and set the calculated threshold level to the clipping unit as the preset threshold level and a differential unit configured to execute differential processing of subtracting a noise signal read from a given photoelectric conversion unit and clipped by the clipping unit, from an image signal read from the given photoelectric conversion unit.

According to another aspect of the present invention, a method of controlling an imaging apparatus having a plurality of photoelectric conversion units configured to output an image signal and a noise signal, and a clipping unit configured to clip the noise signal to a clipping level when the noise signal exceeds a preset threshold level includes calculating the threshold level based on signals read from each of the plurality of photoelectric conversion units, setting the calculated threshold level to the clipping unit as the preset threshold level and subtracting a noise signal read from each of the photoelectric conversion units and clipped by the clipping unit, from an image signal read from the corresponding photoelectric conversion unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
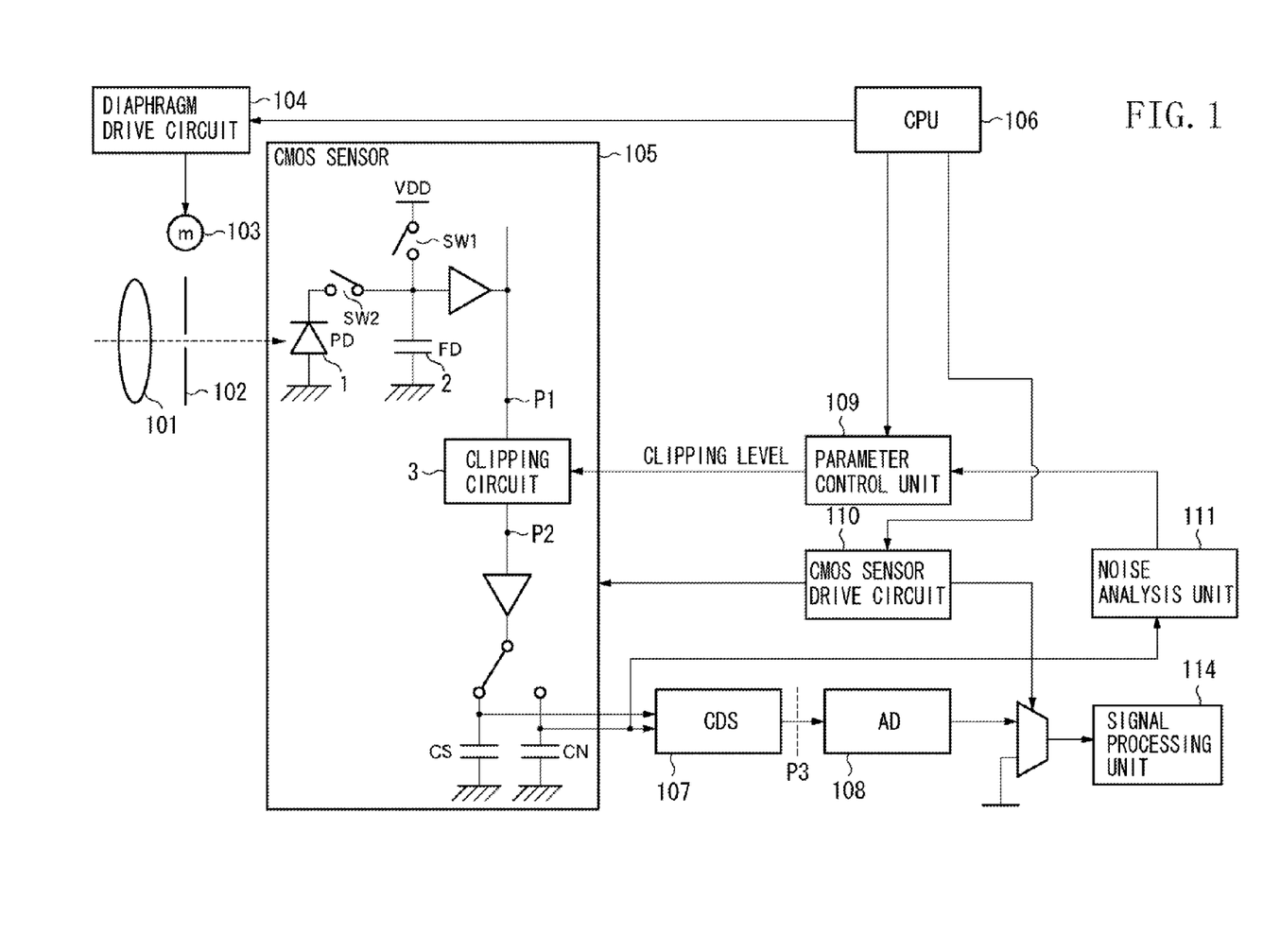
FIG. 1 is a block diagram illustrating a configuration of an imaging apparatus according to a first exemplary embodiment of the present invention.

FIG. 1 is a block diagram illustrating a configuration of one pixel of a CMOS sensor (image sensor), and a configuration of an imaging apparatus having an optical system and a signal processing unit according to a first exemplary embodiment of the present invention.

The light is incident through a lens 101. The amount of the incident light is adjusted by a diaphragm 102 and an image is formed on a CMOS sensor 105. A diaphragm drive circuit 104 controls the diaphragm 102. The diaphragm drive circuit 104 drives the diaphragm 102 via a diaphragm drive motor 103. A CMOS sensor drive circuit 110 controls an electric charge accumulation operation, a reading operation, and a reset operation of the CMOS sensor 105. The CMOS sensor drive circuit 110 can drive the CMOS sensor 105 to execute frame reading at a high speed. The CMOS sensor drive circuit 110 can read a plurality of captured images at a video recording rate. A central processing unit (CPU) 106 controls the diaphragm drive circuit 104, the CMOS sensor drive circuit 110, and a parameter control unit 109.

The CMOS sensor 105 is mainly comprised of a plurality of pixels and a reading circuit. However, in FIG. 1, the CMOS sensor 105 will be described by focusing on a transfer path of one pixel.

First, at the time of capturing the main image which will be described later (during first reading drive), after exposure of the CMOS sensor 105 is started, first a switch SW1 is turned on. Consequently, an accumulated electric charge (noise signal) is reset other than that accumulated in the internal capacitance of a photodiode (PD) 1 that is mainly comprised of a floating diffusion unit (FD) 2 in the input unit of an amplifier 10. Then, after the switch SW1 is turned off, the electric charge of the FD 2 is read out into a capacitance CN. At this time, a noise signal is read out to the capacitance CN after it is subjected to clipping processing by a clipping circuit 3. Next, a switch SW2 is turned on, and an electric charge (image signal) is subjected to photoelectric conversion by the PD1 and accumulated in the internal capacitance of the PD1. The accumulated electric charge is transferred to the FD 2 and read out into a capacitance CS.

This read-out operation is executed for each pixel. The noise signal and the image signal read out into the capacitance CN and the capacitance CS are input to a correlated double sampling (CDS) circuit 107 in that order. The CDS circuit 107 takes a difference between the input image signal and noise signal to output a signal (difference signal) from which the noise component is removed. The difference signal (analog signal) output from the CDS circuit 107 is further converted into digital image data by an A/D converter 108 and subjected to clipping processing in which the upper limit value is restricted in order to suppress the unevenness of the saturation level of each pixel.

The digital image data processed by the A/D converter 108 is output to a signal processing unit 114 and subjected to signal processing.

On the other hand, at the time of capturing a preliminary image which will be described later (during second reading drive), the noise signal read out into the capacitance CN is transmitted to a noise analysis unit 111. Then, according to the result of noise analysis by the noise analysis unit 111, under control of the CPU 106, the parameter control unit 109 sets a threshold clipping level to the clipping circuit 3.

Next, the operation of the imaging apparatus having the above-described configuration will be described referring to a flowchart in FIG. 2.

In the first exemplary embodiment, a preliminary image (first reading drive) for setting a threshold clipping level in the clipping circuit 3 and the main image (second reading operation) for shooting a record target image are captured.

First, in step S11, the CPU 106 starts capturing of a preliminary image (first reading drive). In step S12, the CPU 106 controls the parameter control unit 109 to set the initial value of a clipping level to the clipping circuit 3. The CPU 106 sets a sufficiently large value as the initial value so that clipping is not performed when a preliminary image is read.

Next, in step S13, the CPU 106 drives the CMOS sensor 105. After a preset electric charge accumulation time elapses, the CPU 106 reads out only noise signal N as a preliminary image into the capacitance CN and inputs the read signal N to the noise analysis unit 111. FIG. 3 is an enlarged diagram illustrating the transition of the level of one line of noise signal N read by scanning the CMOS sensor 105 in a horizontal direction. At the time of capturing a preliminary image, the CPU 106 sets an electric charge accumulation time which is short so that an electric charge does not leak to the FD 2. Thus, according to the present embodiment, a noise signal N which is not affected by darkening can be obtained.

As illustrated in FIG. 3, in step S14, the noise analysis unit 111 detects the maximum value of a noise level from the read out noise signal N. Then, in step S15, the noise analysis unit 111 corrects a difference between the maximum value of the detected noise level and an electric charge accumulation time used in capturing the main image which will be subsequently executed, and calculates an estimation value of the maximum value of the noise level in the main image (N'). FIG. 3 also shows one line of noise signal N at the time of capturing the main image which is estimated when a difference between the maximum value and the electric charge accumulation time is corrected. The noise analysis unit 111 determines a clipping level to be used in reading of the main image based on the estimated maximum value of a noise level in the main image. The noise analysis unit 111 outputs a threshold clipping level to be set, to the parameter control unit 109. In step S16, the parameter control unit 109 sets the threshold clipping level to the clipping circuit 3 before reading of the main image is started.

Next, in step S21, the CPU 106 starts capturing of the main image (second reading drive). In step S22, the CPU 106 drives the CMOS sensor 105 to read out a noise signal Nm and an image signal Sm into the capacitance CN and the capacitance CS respectively after a preset electric charge accumulation time elapses. At this time, the noise signal Nm is clipped to the clipping level set by the clipping circuit 3.

In step S23, the noise signal Nm and the image signal Sm read out into the capacitance CN and the capacitance CS in step S22 are input to the CDS circuit 107, and their difference is taken. Thus, an image signal from which a noise signal is removed (difference signal) can be obtained. In step S24, the difference signal output from the CDS circuit 107 is converted into a digital signal by the A/D converter 108. In step S25, the digital signal is output to the signal processing unit 114 and subjected to signal processing to be a recording image.

Figure 4:
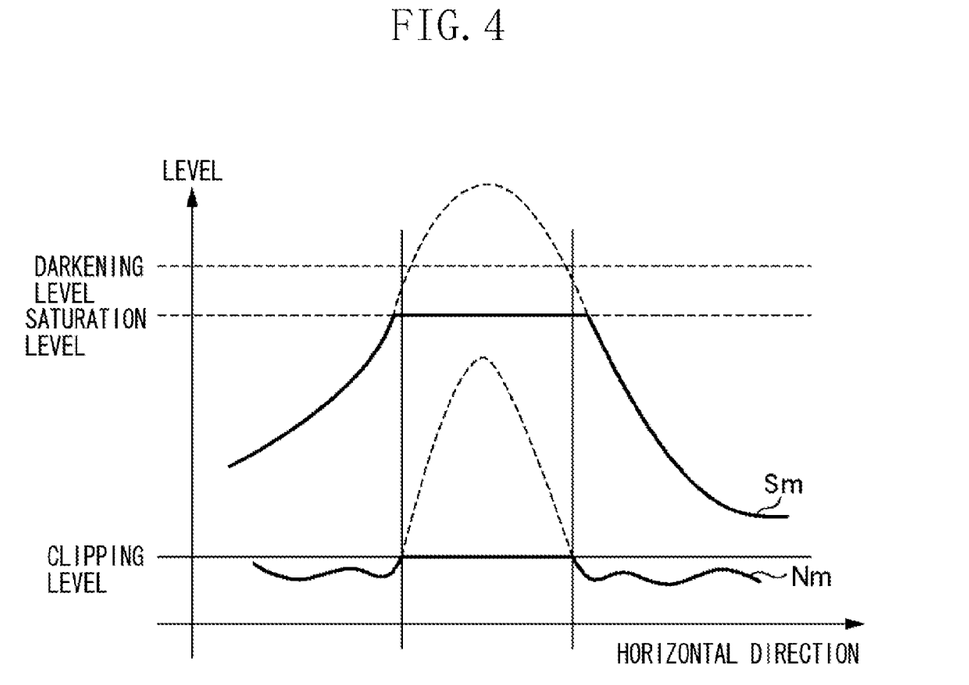
FIG. 4 is a diagram illustrating the level of a signal component of a main image and a clipped noise component according to the first exemplary embodiment.

FIG. 4 illustrates the transition of the level of one line of the image signal Sm and the noise signal Nm of the main image read in step S22. In the example illustrated in FIG. 4, since the image signal Sm of the main image exceeds a darkening level, the noise signal corresponding to the area exceeding the darkening level is clipped by the clipping circuit 3. At this time, a threshold clipping level is applied which is set in step S16 based on the level of the noise signal of a preliminary image.

Figure 2:
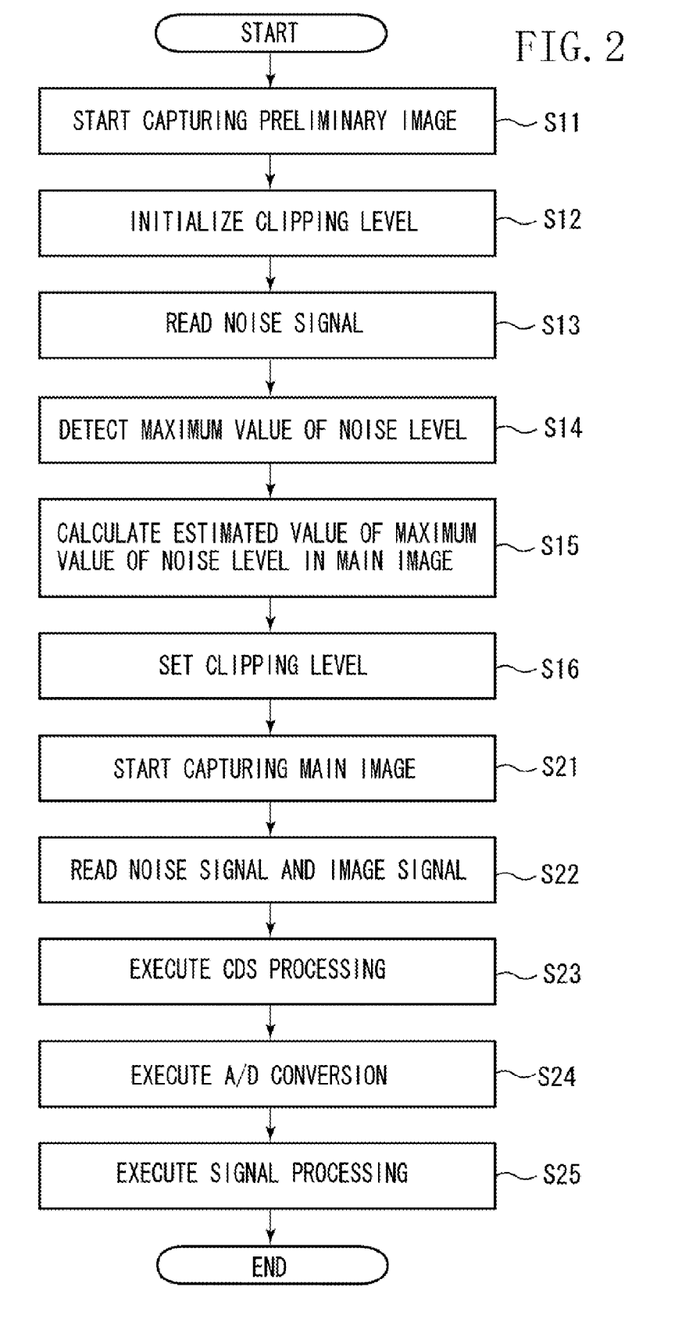
FIG. 2 is a flowchart illustrating imaging processing according to the first exemplary embodiment.
Figure 3:
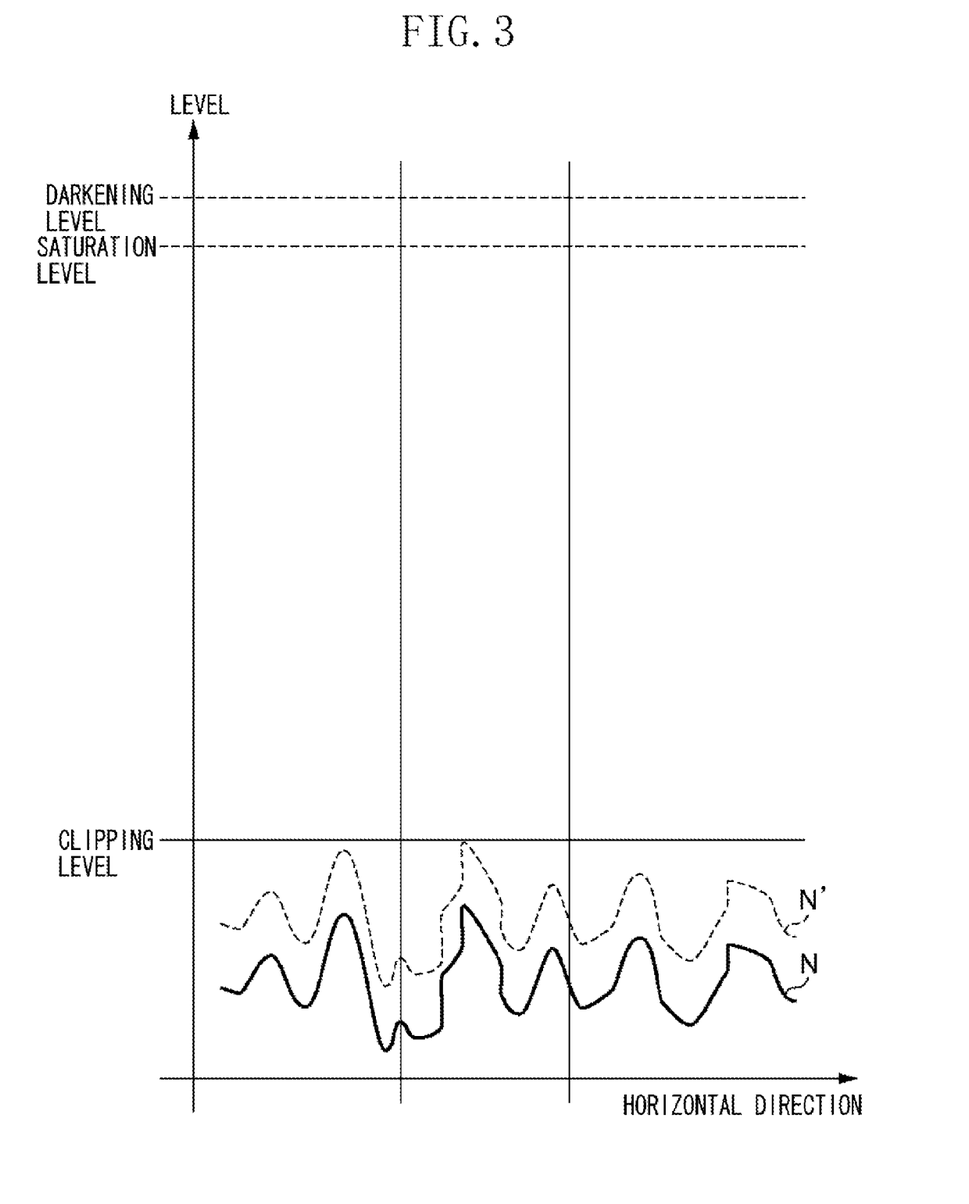
FIG. 3 is a diagram illustrating processing of obtaining a clipping level from a preliminary image according to the first exemplary embodiment.

The processing illustrated in FIG. 2 is executed for each recording frame or field. That is, the CMOS sensor 105 is driven a plurality of times for each recording frame or field in order to read a preliminary image and the main image, and a clipping level is renewed each time. Since the drive control is performed in such a manner, a more suitable threshold clipping level can be set according to a change in environment such as electric voltage and temperature. Thus, deterioration of an S/N ratio can be prevented.

Second Exemplary Embodiment

Figure 5:
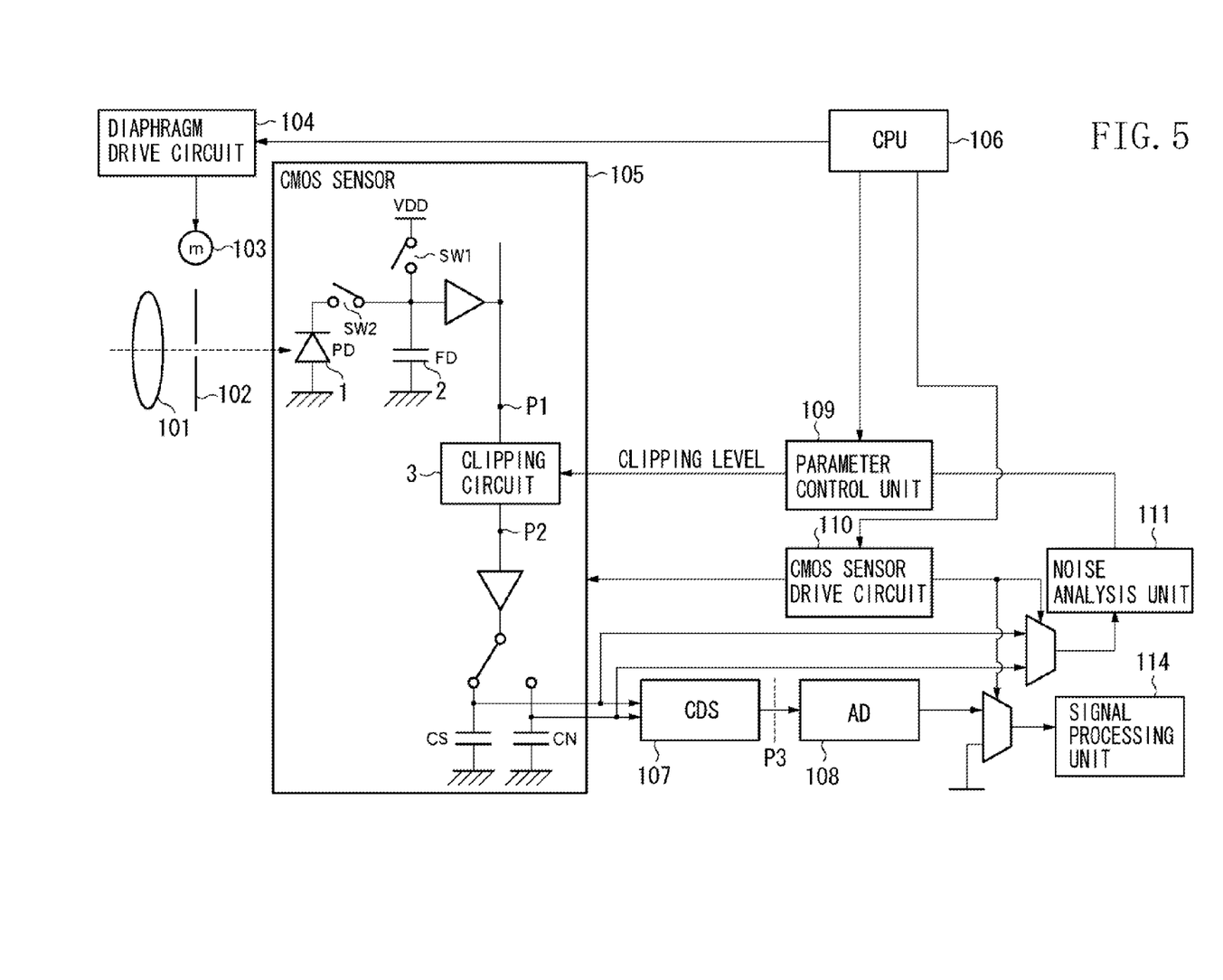
FIG. 5 is a block diagram illustrating a configuration of an imaging apparatus according to a second exemplary embodiment of the present invention.

FIG. 5 is a block diagram illustrating the entire configuration of an imaging apparatus according to a second exemplary embodiment of the present invention. In FIG. 5, the same reference numerals are assigned to portions or components identical to those referring to FIG. 1 in the first exemplary embodiment and description thereof is omitted.

The second exemplary embodiment is different from the first exemplary embodiment in that not only a noise component but also an image signal component is used when a threshold clipping level for capturing of the main image is determined based on a preliminary image.

Referring to the flowchart in FIG. 6, the operation of the imaging apparatus in the present second exemplary embodiment will be described.

First, in step S101, the CPU 106 starts capturing of a first preliminary image (first reading drive). In step S102, the CPU 106 controls the parameter control unit 109 to set the initial value of a clipping level to the clipping circuit 3. A sufficiently large value is set as the initial value so that the signal is not clipped when the first preliminary image is read.

Next, in step S103, the CPU 106 drives the CMOS sensor 105, reads out only an image signal component as the first preliminary image into the capacitance CS after a preset electric charge accumulation time elapses, and inputs the read component to the noise analysis unit 111. At the time of capturing the first preliminary image, the CPU 106 controls an electric charge accumulation time so that the accumulation time becomes equal to that at the time of capturing the main image. As one example of the first preliminary image, FIG. 7 illustrates the transition of the level of one line of image signal Sp which is read by scanning the CMOS sensor 105 in a horizontal direction. An area exceeding a saturation level may further reach a darkening level of a high-brightness area and the level of a noise signal may be increased. In step S104, the noise analysis unit 111 detects a saturation area from the image signal component shown in FIG. 7 and sets the saturation area as an area excluding noise level analysis.

Figure 8:
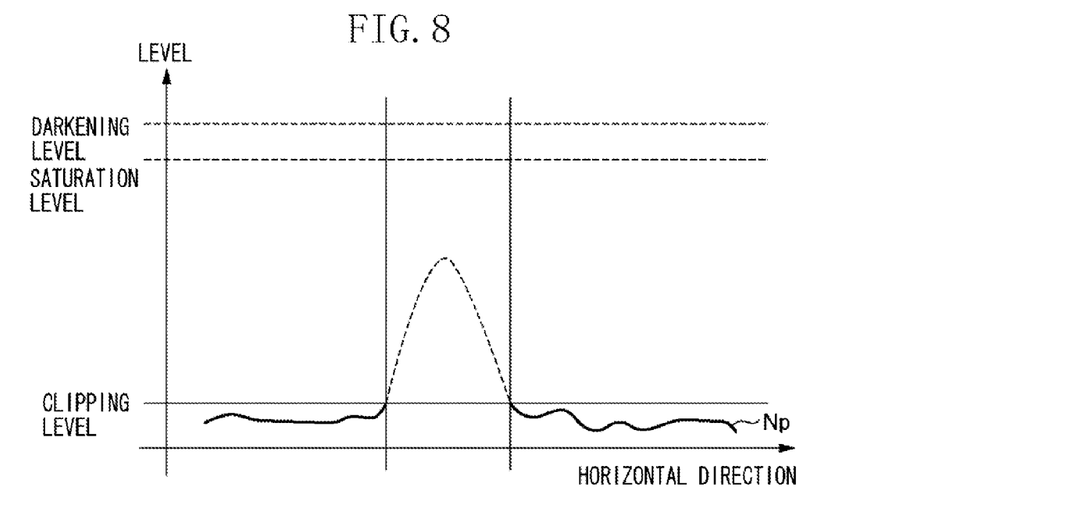
FIG. 8 is a diagram illustrating processing of obtaining a clipping level from a second preliminary image according to the second exemplary embodiment.

Next, in step S111, the CPU 106 starts capturing of a second preliminary image (second reading drive). The CPU 106 drives the CMOS sensor 105 to readout only noise signal Np into the capacitance CN as the second preliminary image. Then, in step S112, the CPU 106 inputs the read noise signal Np to the noise analysis unit 111. At the time of capturing the second preliminary image, the CPU 106 also controls an electric charge accumulation time so that the accumulation time becomes equal to that at the time of capturing the main image. Further, since the clipping level of the clipping circuit 3 is initialized in step S102, the noise signal Np is not clipped. As one example of the second preliminary image, FIG. 8 illustrates the transition of the level of one line of noise component Np which is read by scanning the CMOS sensor 105 in a horizontal direction.

In step S113, the noise analysis unit 111 detects the maximum value of the noise signal Np output from an area except an area excluding noise level analysis detected in step S104 among the read noise signal Np. Then, the noise analysis unit 111 determines the maximum value of the detected noise level as a clipping level used at the time of reading the main image and outputs a clipping level to be set, to the parameter control unit 109. In step S114, the parameter control unit 109 sets a clipping level to the clipping circuit 3 before reading of the main image is started.

Next, the CPU 106 executes capturing of the main image (third reading drive). However, since the processing executed herein is identical to the processing executed in steps S21 to S25 in FIG. 2, the same reference numerals are assigned and description thereof is omitted.

Figure 6:
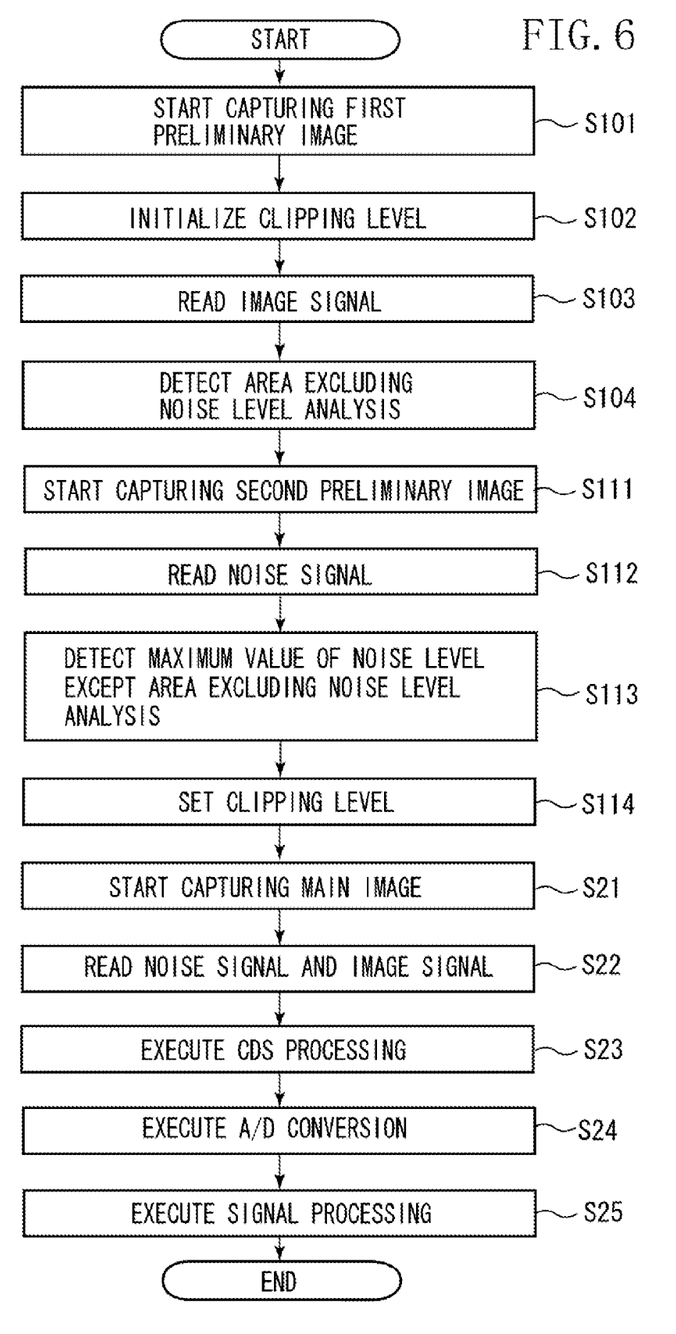
FIG. 6 is a flowchart illustrating imaging processing according to the second exemplary embodiment.
Figure 7:
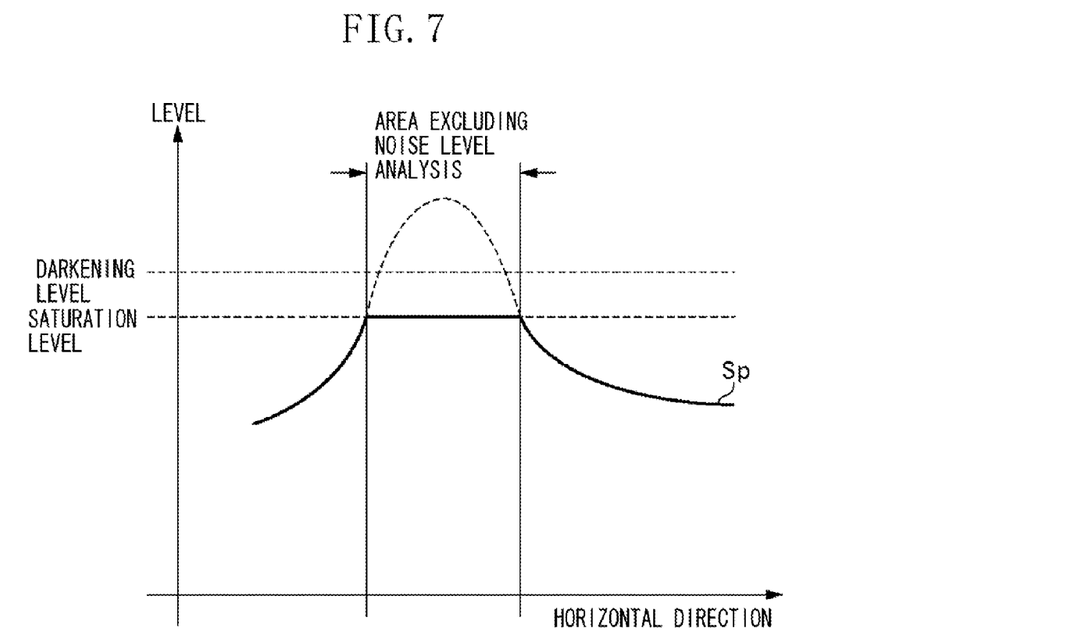
FIG. 7 is a diagram illustrating processing of detecting an area excluding noise level analysis from a first preliminary image according to the second exemplary embodiment.

The processing illustrated in FIG. 6 is executed for each recording frame rate or field rate. That is, the CMOS sensor 105 is driven a plurality of times for each recording frame or field in order to read the first preliminary image, the second preliminary image and the main image, and a clipping level is renewed each time.

As described above, according to the second exemplary embodiment, a more suitable clipping level can be set according to a change in environment such as electric voltage and temperature. Thus, deterioration of an S/N ration can be prevented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
   a plurality of photoelectric conversion units each configured to output an image signal and a noise signal;
   a drive unit configured to execute a first reading drive for reading noise signals from each of the plurality of photoelectric conversion units and a second reading drive for reading noise signals and image signals from each of the plurality of photoelectric conversion units after the first reading drive is executed;
   a clipping level control unit configured to calculate an estimation maximum value of the noise signals which can be obtained by the second reading drive based on a maximum value of the noise signals obtained by the first reading drive, and determine a clipping level based on the estimated maximum value;
   a clipping unit configured to clip each noise signal to the clipping level; and
   a processing unit configured to subtract the noise signal, which was clipped by the clipping unit, from an image signal obtained by the second reading drive.

2. The imaging apparatus according to claim 1, wherein an electric charge accumulation time in the plurality of photoelectric conversion units during the first reading drive is shorter than an electric charge accumulation time during the second reading drive, and
   wherein the clipping level control unit is configured to set the clipping level based on a difference in electric charge accumulation time during the first and the second reading drives.

3. A method of controlling an imaging apparatus having a plurality of photoelectric conversion units configured to output an image signal and a noise signal, and a clipping unit configured to clip the noise signal to a clipping level when the noise signal exceeds the clipping level, the method comprising:
   executing a first reading drive for reading noise signals from each of the plurality of photoelectric conversion units;
   executing a second reading drive for reading noise signals image signals from each of the plurality of photoelectric conversion units after the first reading drive is executed;
   calculating an estimation maximum value of the noise signals which can be obtained by the second reading drive based on a maximum value of the noise signals obtained by the first reading drive;
   determining a clipping level based on the estimated maximum value;
   subtracting the noise signal, which was clipped by the clipping unit, from an image signal obtained by the second reading drive.

* * * * *